United States Patent [19]
Strauff

[11] 3,927,602
[45] Dec. 23, 1975

[54] PRESSURE FOLLOW-UP CONTROL SYSTEM FOR SERVO STEERING GEARS OR SIMILAR DEVICES
[75] Inventor: Günther Strauff, Kaarst, Germany
[73] Assignee: Langen & Co., Dusseldorf, Germany
[22] Filed: Aug. 24, 1973
[21] Appl. No.: 391,272

[30] Foreign Application Priority Data
Aug. 26, 1972  Germany............................ 2242022

[52] U.S. Cl. ................................. 91/372; 91/375 R
[51] Int. Cl.² ........................................... F15B 9/10
[58] Field of Search ............. 91/373, 372, 370, 371, 91/375 R, 375 A

[56] References Cited
UNITED STATES PATENTS
2,018,197  10/1935  Vorech et al. ......................... 91/372
2,754,924  7/1956  Hammond ............................. 91/372
2,763,159  9/1956  Barth et al. ............................ 91/372
2,954,837  10/1960  Ziskal .................................... 91/373
3,433,127  3/1969  Thompson ............................. 91/372

FOREIGN PATENTS OR APPLICATIONS
975,518  7/1961  United Kingdom................ 91/375 A
648,691  9/1962  Canada.................................. 91/370

Primary Examiner—Paul E. Maslousky
Attorney, Agent, or Firm—Holman & Stern

[57] ABSTRACT

A pressure follow-up control system which includes a pair of control valves operated by a mutually interposed member. Each of the control valves comprises a pressure regulating valve which is regulating the pressure of an operational area of a hydraulic servo-motor, with the valves having a capability for producing a connection between a pressure source and an operational area at low pressures, while blocking this connection when the pressure in the operational area arrives at a certain value and opening a connection from the operational area to a return line when the pressure exceeds the certain value.

2 Claims, 2 Drawing Figures

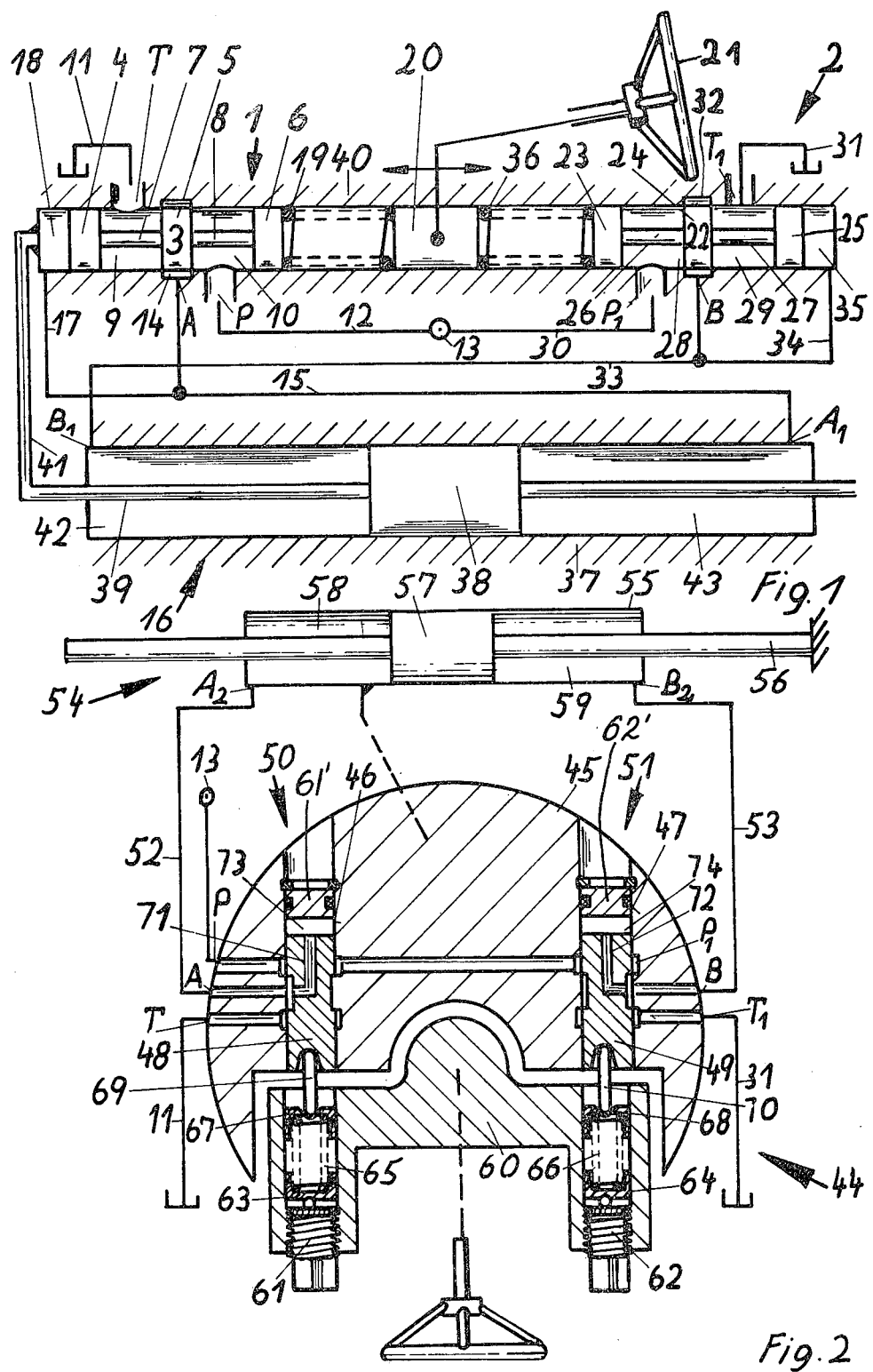

PRESSURE FOLLOW-UP CONTROL SYSTEM FOR SERVO STEERING GEARS OR SIMILAR DEVICES

BACKGROUND AND SUMMARY OF THE INVENTION

The present invention concerns a pressure follow-up control system for servo-steering gears or similar devices. The system includes two control valves which are operated by means of a mutually interposed member for the purpose of alternately connecting the functional areas of a hydraulic servo-motor to a pressure-source or an outlet as well as with a mechanical feedback means of the movements of the servo-motor and means for applying a reactive force derived from the pressure in the working chambers to the actuating member by means of reaction faces on the control valves or on reaction members operatively associated with the control valves.

Known in the prior art are pressure follow-up control systems such as that disclosed in German Patent No. 1,001,132. The construction of this prior art system comprises two control pistons which serve as control members and which are counterrotatingly operated by a lever which serves as a torque dynamometer. The control valves are hinged to the lever by means of stems. If the control pistons have a positive overlap, the operational areas of the servo-motor in a neutral position are then separated from the pressure source, and usually also from the outlet. This results in the possibility that a substantially lower pressure is present in the operational areas than that produced by the pressure source.

When a control piston is operated, pressure fluid may, therefore, under a high pressure drop flow into an operational area of lower pressure. This can result in undesirable jerks and shocks in the system. It is, therefore, desirable to build up pressure slowly, i.e., to retain a certain pressure in the operational areas from the start for the purpose of providing a hydraulic setting. The latter method finds use in practice in the form of control pistons with negative overlap, also called "open-center construction". In such an arrangement, all passages are connected with each other in the neutral position, so that a certain dynamic pressure is retained. Since this arrangement requires a constant flow, however, there exists no possibility to utilize this arrangement for hydraulic circuits with a pressure storage, and to obtain thereby the advantages of a positive overlap.

It is within the scope of the present invention to prevent the above-mentioned disadvantages, i.e., to retain a certain pressure in the operational areas without a substantial consumption of fluid in a pressure follow-up control system of the above-mentioned type, and also in a neutral position. In addition, the amount of pressure should be adjustable. Finally, it should also be possible, as is the case with other pressure follow-up control systems, to provide limitations on the input force, control resolutions, etc.

The solution of the above problems is accomplished by the present invention, in which each of the control valves represents a pressure control valve which is regulated by the pressure of an operational area with the help of reaction surfaces against the force of a regulating spring, the control valves being of a type which, when operating below a certain pressure, will create a connection from the pressure source to the operational area, and will increasingly restrict this connection when the pressure increases and finally block this connection, and upon continuing increase of pressure establish a connection from the operational area to the return line, and in that the regulating springs support themselves on a mutually interposed member. In order to be able to set the pressure regulating valves in a neutral position so that equal pressures result in the operational areas, the initial stress of at least one regulating spring is adjustable. It may, furthermore, often be advantageous to arrange the regulating spring in such a manner, that after overcoming a certain spring deflection there results a mechanical contact between the interposed member and the pressure regulating valves.

BRIEF DESCRIPTION OF THE DRAWINGS

The present invention is explained in greater detail by the embodiments illustrated in the accompanying drawings, wherein:

FIG. 1 illustrates schematically an arrangement having two pressure regulating valves, coaxially arranged and operated by means of a translatorily-movable interposed member; and FIG. 2 shows two pressure regulating valves which are mounted transversely and eccentrically to the axis of a housing, with a mutual rotatably-movable interposed member as well as adjusting means for adjusting the initial stresses of the governing springs.

DESCRIPTION OF THE PREFERRED EMBODIMENTS

The pressure follow-up control system according to FIG. 1 includes two pressure-control valves 1 and 2. The pressure-control valve 1 has a control piston 3 which is provided with three shoulders 4, 5, 6. The shoulders 4 and 5 are connected to each other by means of a reduced shank 7, while a reduced shank 8 is mounted between shoulders 5 and 6. The annuluses surrounding the reduced shanks 7 and 8 are indicated with numerals 9 and 10. A port T comprising outlet means is provided in the area of the annulus 9, which port T connects with a return line 11. In the area of the annulus 10, however, there is provided a port P which is connected with a pressure source 13 by means of a pressure pipe 12. The shoulder 5, in a neutral position of the control piston 3, is surrounded by an annular tee-slot 14 which is connected with the port A of a servo-motor 16 by means of a port A1 and a conduit 15.

A control line 17 branches off conduit 15, and is connected to reaction area 18 which is adjacent the free front area of shoulder 4. The free front area of shoulder 6 is stressed by a regulating-spring 19 which is supported at its opposite end on an interposed member 20. This interposed member 20 may be connected actuation means, for example, to a steering wheel 21. The pressure-regulating valve 2 has a control piston 22 which is provided with three shoulders 23, 24 and 25, separated from each other by means of reduced shank members 26 and 27. The shank members 26 and 27 are surrounded by annuluses 28 and 29. Communicating with the annulus 28 is a port $P_1$ which is connected with the pressure source 13 by means of a pressure pipe 30. The annulus 29 is in communication with outlet means including the return line 31 a port $T_1$. In a neutral position of the control piston 22, the shoulder 24 is surrounded by an annular tee-slot 32, in fluid engagement with a port B which is connected with the port $B_1$ of the servo-motor 16 by means of a connecting line 33. A control line 34 branches off from the connecting line 33, said control line 34 leading into a reaction area 35 which is adjacent the free front-area of shoulder 25. The free front area of shoulder 23 is stressed by a regulating spring 36 which is supported at its opposite end on interposed member 20. The servo-motor 16 is provided with a cylinder 37 in which a piston 38 is slidably arranged. The piston 38 is fixedly connected with a bilateral piston rod 39. Between the piston rod 39 and the housing 40 of the pressure follow-up control system there is provided a mechanical feedback 41. The piston rod 39 is surrounded by functional or operational areas 42 and 43. Port $A_1$ is connected to functional area 43, while port $B_1$ is connected to functional area 42.

In order to explain the operation of the apparatus of the present invention, it will be assumed that the regulating springs 19 and 39, as shown by the position of control pistons 3 and 22 in FIG. 1, are provided with a certain amount of initial stress, and that the entire hydraulic system, on the other hand, is initially without pressure. Since there is, therefore, no pressure in the reaction chambers 18 and 35, the regulating springs 19 and 36 will push the control pistons 3 and 22 outwardly up to their stop means; this displacement of the control pistons will cause the connections between ports P and A and between $P_1$ and B to open. As the pressure from source 13 begins to build up, this pressure will pass via pressure pipe 12, the port P, annulus 10, annular teeslot 14, the port A, the pipe 15, and control line 17 into the reaction chamber 18. Pressure from the pressure source 13 reaches, in a similar manner, the reaction chamber 35 via pipe 30, port $P_1$, annulus 28, tee-slot 32, port B, pipe 33 and control line 34.

If no outside forces affect the piston 39, piston rod 38 is subjected on both sides to the same pressure. The pressure which thereby develops in the operational areas 42 and 43 is also developed to approximately the same extent in the above-mentioned reaction chambers 35 and 18, so that the pressure in this area will cause the displacement of the control pistons 3 and 22 inwardly against the force of the regulating springs 19 and 39. During this displacement, the connections between ports P and A and between $P_1$ and B tend to become interrupted and connections are finally totally interrupted. The pressure which now exists in the functional areas 42 and 43 corresponds with the initial stress of the regulator springs 19 and 36 and the system is pressurized but in a neutral position.

Assuming actuation occurs and the interposed member 20 is moved to the left, the regulator spring 19 will receive a greater initial stress (force) and will displace the control piston 3 to the left, and the connection P-A is again opened to some degree. On the other hand, during the movement the initial stress of the regulating spring 36 is reduced or relieved. On the basis of this reduction, the pressure in the reaction chamber 35 now exceeds the pressure of the regulator spring 36, and the control piston 22 will also move to the left. The connection B-$T_1$ will open as a result of this displacement, so that pressure can flow from the functional area 42 via port $B_1$ and pipe 33 to the return line 31. Upon further displacement of the interposed member 20 to the left, the regulating spring 19 is further stressed and the regulating spring 36 is still further released or relieved. This process is continued until such a force is exerted on the piston 38 based on the pressure variations which develop in the operational areas 43 and 42 that the outer forces which affect the piston rod 39 are overcome. Since the movement of the piston rod 39 is transferred to the housing 40 of the pressure follow-up control system 1 by means of the mechanical feedback 41, the housing 40 is automatically placed into a position which corresponds with the original neutral position where fluid no longer circulates.

Contrary to the foregoing procedure, if the interposed member 20 is moved to the right, the initial stress of the regulating spring 19 is reduced and the control piston 3 moves to the right, thus opening the connection A-T. The initial stress of the regulating spring 36, however, is increased so that the control piston 22 moves also to the right and produces thereby a connection between ports $P_1$ and B. This connection causes a reduction of the pressure in the area 43, while the pressure in operational area 42 increases. As a result, the control piston 38, due to the developing pressure differences, moves also to the right. The amount of the developing pressures in the functional areas 42 and 43 is thereby determined by the initial stresses of the regulating spring 36 and 19 alone, since these initial stresses correspond in size to the forces which result from the pressures and effective areas of the piston rods 3 and 22.

It is pointed out, in connection with the previous description, that the illustrated feedback 41 represents one form of an effective connection between the piston rod 39 and the housing 40 and that, in practice, there are various systems for realizing such a feedback. Also, in place of a fixed cylinder 37, piston 38, can be fixedly arranged with the piston rod 39, whereby the cylinder 37 is movable and feedback would then exist between the cylinder 37 and the housing 40. In addition, an additional elastic mechanical coupling may be provided between the interposed member and the movable part of the servo-motor, either initially or such a coupling may be provided after the overcoming of a predetermined pitch of the spring. The form of the pressure-regulating valve is freely selectable also within certain limits, and the form of the control pistons is advantageously identical to that described hereinbelow in regard to FIG. 2.

The pressure follow-up control system 44 according to FIG. 2 includes a housing 45 which is provided with boreholes 46 and 47 located transversely and eccentrically to the axis of the housing 45. Control pistons 48 and 49 of pressure-regulating valves 50 and 51 are slidably arranged in these boreholes 46 and 47. The ports are indicated by the identical reference numerals as shown in FIG. 1. It should, however, be noted that the ports are normally located in a connection-element (not illustrated) with which the housing 45 cooperates in a type of rotary-distributor. This will guarantee that the housing 45 can be turned in any selected position while fixed pipe-connections can nevertheless be placed on the connecting element. Pipes 52 and 53 originate from ports A and B and connect to Ports $A_2$ and $B_2$ of a servo-motor 54. This servo-motor 54 is provided with a movable cylinder 55, in which a piston 57, which is fixedly connected with a laterally mounted piston-rod 56, is slidably arranged. Port $A_2$ is connected with a functional area 58 within the servo-motor 54, while port $B_2$ terminates in a functional area 59.

The operation of the control pistons 48 and 49 is provided by means of a rotatable interposed member 60 which, for example, may be connected to actuating means such as a steering wheel. In the interposed member 60 there are located adjustment elements 61 and 62 which affect the regulating springs 65 and 66 via spring-plates 63 and 64. The regulator springs 65 and 66 support themselves on the drive rods 69 and 70 via additional spring plates 67 and 68, whereby the drive rods affect the control pistons 48 and 49. Inside the control pistons 48 and 49 there are located control lines 71 and 72, leading towards the reaction chambers 73 and 74 which are adjacent the front areas of the control piston.

In order to explain the function of the pressure followup control system 44 according to FIG. 2, it may first be assumed that the pressure source 13 does not deliver pressure and that no outside forces affect the servo motor 54. The control springs 65 and 66 respectively displace the control pistons 48 and 49 to an extent until they abut against the respective plus 61' and 62', which plugs seal off the reaction areas 73 and 74. In these switch positions are produced the connections P-A or $P_1$-B. If the pressure source 13 effects a pressure build-up, then the pressure flows via the connection A, the pipe 52 and the connection $A_2$ into the working space 58 as well as simultaneously via the control pipe 71 into the reaction chamber 73. On one side, the flow of pressure is made from connection $P_1$ via the connection B, the pipe 53 and the connection $B_2$ into the working space 59 and simultaneously via the control pipe 72 into the reaction chamber 74. The pressure increase in the reaction chambers 73 and 74 effects a displacement of the control pistons 48 and 49 counter to the force of the springs 65 and 66 until the connections P-A and $P_1$-B are again closed. Under the expression "closed" it is not intended herein that a hermetical sealing be effected but it is intended that a slight leakage pass from P to A, or from A to T, whereby these leakages in a balanced state are equal, at the other side, the leakage flows from $P_1$ to B, or from B to $T_1$. It should be noted that the strength of the springs 65 and 66 is measured so that there exists a predetermined positive initial pressure in the working spaces 58 and 59 or in the reaction chamgers 73 and 74 in the described closed switch position. If the steering wheel, and therewith the activating member 60, are rotated clockwise, then the spring 65 obtains a somewhat higher initial stress, which at first will overcome the pressure existing in the reaction chamber 73, and thereby releases again the connection P-A. Simultaneously the spring 66 is stressed to some extent, so that the control piston 49, due to the pressure existing in the reaction chamber 74, is guided after the spring 66 which is released and the connection B-$T_1$ is released. The result is that pressure is able to flow into the working chamber 58, while pressure is able to flow from the working chamber 59. Simultaneously, the cylinder 55, due to the thereby developing pressure-reduction, is moved to the left. Since a mechanical return-coupling exists between the cylinder 55 and the housing 45, as indicated by the broken line, the housing 45 is moved clockwise in such a manner so that it follows the movement of the activating member 60 and closes again the connections P-A or B-$T_1$. During this process, it was considered that the force which develops on the cylinder 55 is sufficient for overcoming the outside forces. In case where the force is insufficient, the activating member 60 must be turned or rotated further relative to the housing 45, in order to obtain a higher stressing of spring 65. A higher pressure in the reaction chamber 73 or reaction chamber 58 corresponds with the higher stressing of spring 65. A return-positioning of the cylinder 55 into its neutral position may be accomplished by means of outside forces, such as is the case, for example, in the turning wheels of motor vehicles. Under the consideration that the steering wheel has been released, there would take place, for example, a pressure increase in the working chamber 58 during a movement of the cylinder 55 to the right, which movement is effected from outside, and said pressure increase would continue into the reaction chamber 73 and would there affect the control piston 48 against the force of spring 65 so that the connection A-T is produced by this pressure. This will permit the outflow of pressure from the working chamber 58. Simultaneously, the working space 59 increases so that therein, and in reaction chamber 74, pressure decreases. The spring 66 is therefore in a position to displace the control piston 49 in a manner so that the connection $P_1$-B will be produced and pressure is able to flow into the increasing working chamber 59. However, in that area there will not develop a substantial pressure increase but this will be only a pressure level which corresponds with the initial stressing of spring 66. This process continues for as long as the outside forces affect the cylinder 55. If the outside forces are insufficient to move the cylinder 55, then the steering wheel, and therewith the activating member 60, must be moved into the opposite direction, i.e., counter-clockwise. The initial stress of spring 66 is thereby enlarged to a small extent, and displaces the control piston 49 into a position which will release the connection $P_1$-B so that pressure is able to flow into the working chamber 59. Simultaneously therewith, the initial stress of the spring 65 reduces to some extent so that the pressure in the reaction chamber 73 is able to move the control piston 48 into a position which will release the connection A-T. This will cause a pressure-reduction between the working chambers 59 and 58 and the cylinder 55 will, as desired, move to the right and follows the direction of movement of the steering wheel. Due to the mechanical return-coupling, the housing 45 will also move, namely, so long until the aforementioned connections are again locked. The activating member 60, when there is insufficient outside forces, is moved into a predetermined position by means of the springs 65 and 66. Since in that position, the control pistons 48 and 49 will take their blocking position, it will be possible with the aid of adjustment screws 61 and 52 to center the activating member 60 relative to the housing 45. A centering without pressure use is, in the illustrated arrangement, only possible when the springs 65 and 66 have an initial stress also when the control pistons 48 and 49 are moved up to the abutment. A rotating of the activating member 60 counter-clockwise, or a displacing of the cylinder 55 by means of outside forces to the left will always effect the identical movement for the other control piston and the other working spaces, so that no detailed explanation is provided.

The present invention is by no means limited to the illustrated embodiments. It is, for example, possible to utilize two individually effective cylinders in place of the illustrated dual-effective cylinders. it is also possible to parallelswitch a plurality of dual or individually effective cylinders, and, in such a case, corresponding functional areas must be connected. Additional embodiments are also possible in the form of control pistons as well as in the type of the manipulation. Even though the regulating springs are illustrated as helical springs, it should be understood that other types of springs may be used. Thus, for example, it is possible to provide the interposed member of FIG. 2 with plate-springs or to construct this member in the form of plate-springs.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred embodiments thereof.

I claim:

1. A fluid-pressure-responsive follow-up control system for servo-systems comprising, in combination: fluid-operated servo-motor means (16, 54) including two operational areas (42, 43 & 58, 59);
 a fluid pressure source (13);
 fluid outlet means (T, T₁);
 an output member (40, 45) including mechanical feedback means operably connected to said servo-motor means (16, 54);
 an input member (20, 60) having relative movement to said output member (40, 45);
 a pair of control pistons (1, 2 and 50, 51) in said output member (40, 45);
 fluid connection means (15, 33 & 52, 53) between said operational areas (43, 42 & 58, 59) of said fluid-servo-motor means (16, 54) and said control pistons; (1, 3, 50, 51)
 said control pistons (1, 3, 50, 51) including control portions selectively connecting via said fluid connection means (15, 33, 51, 53) said operational areas (42, 43, 48, 49) with said fluid pressure source (13) or said fluid outlet means (T, T₁) in response to slight relative movements between said input (20,60) and output member (40, 45) or blocking said fluid connection means (15, 33, 42, 53) from said fluid pressure source (13) and said outlet means (T, T₁) in a neutral position;
 each control piston (1, 2, 50, 51) including at least one fluid pressure reaction area (18, 35, 33, 74) in communication with said fluid connection means (15, 33, 52, 43);
 spring means (65,66,14,36) interposed between said input member (10,60) and said control pistons (1, 3, 50, 51);
 said spring means (14,36,65,66) imposing residual biasing forces on said control pistons (1,2,50,51) contrary to the force caused by fluid pressure on said reaction areas (18,35,73,74).

2. The follow-up control system as claimed in claim 1 including means operatively connected to at least one of said spring means for adjusting its residual biasing force.

* * * * *